United States Patent
Bieren et al.

(10) Patent No.: US 8,812,483 B2
(45) Date of Patent: Aug. 19, 2014

(54) SYSTEM AND METHOD FOR OPTIMIZING WEB SEARCHING AND SCHEDULING OF SERVICE PROVIDERS

(76) Inventors: Julien Bieren, London (GB); Pierre-Jean Camillieri, London (GB)

( * ) Notice: Subject to any disclaimer, the term of this patent is extended or adjusted under 35 U.S.C. 154(b) by 128 days.

(21) Appl. No.: 13/517,562

(22) Filed: Jun. 13, 2012

(65) Prior Publication Data
US 2012/0330970 A1    Dec. 27, 2012

Related U.S. Application Data

(60) Provisional application No. 61/499,219, filed on Jun. 21, 2011.

(51) Int. Cl.
*G06F 17/30*    (2006.01)
(52) U.S. Cl.
USPC .......................................................... 707/713
(58) Field of Classification Search
None
See application file for complete search history.

(56) References Cited

U.S. PATENT DOCUMENTS

| | | | | |
|---|---|---|---|---|
| 2005/0153760 | A1* | 7/2005 | Varley | 463/1 |
| 2006/0178187 | A1* | 8/2006 | Walker et al. | 463/16 |
| 2007/0233671 | A1* | 10/2007 | Oztekin et al. | 707/5 |
| 2007/0239529 | A1* | 10/2007 | Baluja et al. | 705/14 |
| 2008/0306826 | A1* | 12/2008 | Kramer et al. | 705/14 |
| 2010/0293029 | A1* | 11/2010 | Olliphant | 705/9 |
| 2011/0137776 | A1* | 6/2011 | Goad et al. | 705/34 |

* cited by examiner

*Primary Examiner* — Wilson Lee
(74) *Attorney, Agent, or Firm* — James M. Smedley, Esq.; James M Smedley LLC

(57) ABSTRACT

A system for optimizing web searching and scheduling of service providers which has three main characteristics: a system and method for search optimization that automatically aggregates service providers and their services; checks, in real time, the availability information for the service providers; and proposes one or more optimized series of services for which there is availability. First, service providers and their services, including schedule are aggregated. Second the system checks, in real time, the availability information for the service providers. The availability is used as a criterion for the schedule optimization. Finally, the system proposes one or more optimized series of services for which there is availability, and that will take place in a given period of time. The optimization process aims at scheduling this succession of events under various constraints. An optimization algorithm assigns a score to each series of services that can thereby be ranked.

18 Claims, 5 Drawing Sheets

Fig. 2

SYSTEM AND METHOD FOR OPTIMIZING WEB SEARCHING AND SCHEDULING OF SERVICE PROVIDERS

CROSS REFERENCE TO RELATED APPLICATIONS

This application claims priority from U.S. Patent Application Ser. No. 61/499,219, entitled "System and method for optimizing web searching and scheduling of service providers", filed on Jun. 21, 2011. The benefit under 35 USC §119 (e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to a system and method for search optimization. More specifically, the present invention relates to a system and method for search optimization that automatically aggregates service providers and their services, checks, in real time, the availability information for the service providers, and proposes one or more optimized series of services for which there is availability.

BACKGROUND OF THE INVENTION

Service users use the internet more and more to find and book services from service providers. For example, a service user can use the internet to book diner in a restaurant, to book a show in a theatre, to book an appointment with a doctor, etc. The internet is becoming a very comprehensive "market place" where "service providers" and "service users" meet. Yet, every transaction tends to be handled separately. For example, it is easy to book a restaurant on one website, and to book a concert on another website. Sometimes, it is even possible to book both of them on the same website. But it is the user's responsibility to find services that go great together or are complimentary. By "go great together" or complimentary it is meant, services or activities that form a succession optimized against pre-defined criteria. Such criteria typically include: activities in the succession should not overlap in time; and activities in the succession should be geographically close from each other. A service user might also want to consider additional criteria. For example: overall price for the succession; or reviews for the activities in the succession Currently no automated system or method exists that, taking into account a service user request, is able to propose a flexible succession of activities matching user-defined criteria, that "go great together." It is therefore an objective of the present invention to teach such as system and method.

If, for example, a group of friends have a Saturday to spend together in a city, they know they will want to do one or more activities together. There is currently no automated and integrated internet based system or method to answer the following simple query: we are eight; we are in London; we are free from 10 am to midnight next Saturday; we want to go see a movie, go to a concert, and have diner in a restaurant; with one or more optimized succession of activities for them to book.

Based on the systems and methods currently known in the art, they will have to either find pre-packaged deals—but with no or limited flexibility, or, most of the time, plan themselves activities that "go great together". To achieve the latter, this group of friends will have to go through the following steps: (1) identify cinemas, concerts and restaurants in the area where they plan to be, (2) for each of them, verify availability, and (3) optimize their choice of activities so that they do not overlap in time, are in close geographical proximity, and potentially satisfy other custom criteria such as best reviews, and desired price/costs. In practice, the three steps above are not sequential but interleaved and the whole process often requires many iterations: the group might find a concert they like but then realize there is no restaurant with availability for eight in the vicinity, etc. This organization and optimization process applies every time a service user who by definition has limited time available is dealing with service providers who, by definition, have limited availability. Service users want to make the most of their free time and need to juggle with service providers' availability.

The system and method taught by the present invention solves this organization challenge, thanks to the unique combination of three main features: (1) providing a hub for service providers; (2) providing the ability to check, in real time, the availability of these service providers (typically, service providers have limited availability per time slot. For example, a cinema has a limited number of seats per show. A doctor can receive a limited number of patients every day); and (3) providing the ability to optimize a stream of service providers under various constraints.

DEFINITIONS

Service Provider. "Service Provider" is defined as any establishment, professional, or company that offers a service or activities for individuals or groups of individuals.

Service/Activity A "service" or "activity" can be a live performance, an appointment, the right to use a venue, etc. For example: a restaurant (service provider) where you can have "diner" (service/activity); a venue or venue promoter (service provider) that hosts concerts (services/activities); a cinema (service provider) that shows movies (services/activities); a doctor (service provider) who offers appointments (service/activity); a squash club (service provider) where players can book a court for a specific time slot (service/activity); or an airline company (service provider) that offers specific flights (service/activity).

Service user. "Service user" is defined as any individual or group of individuals who use a service offered by a service provider. For example: a couple (service user) who has a reservation for diner at a specific time in restaurant (service/activity); a group of friends (service user) who have tickets for a concert (service/activity); a patient (service user) who has an appointment with their doctor (service/activity); or a family (service user) that has a reservation on an airline for a specific flight (service/activity).

SUMMARY OF THE INVENTION

The system for optimizing web searching and scheduling of service providers taught by the present invention has three main characteristics. The present invention teaches a system and method for search optimization that automatically aggregates service providers and their services; checks, in real time, the availability information for the service providers; and proposes one or more optimized series of services for which there is availability. The system is versatile and can be used for virtually all types of service providers.

First, the system automatically aggregates service providers and their services, including schedule. For example, for a specific concert venue, the system is able to tell that there will be a classical music concert with certain orchestra playing a specific performance, on that specific date, at that specific time. The system also aggregates additional data on these service providers such as: address, phone numbers, reviews, etc. All data referring to a specific service provider is aggregated from potentially multiple data sources. For example, these sources can be the provider website itself, online booking services that gather providers' information, etc.

Second, wherever possible, the system can check, in real time, the availability information for the service providers. The availability is used as a criterion for the schedule optimization defined in the third point. For the concert example with the first characteristic above, the system will be able to tell at any time that there are a number of seats left in the front stalls, at a given price, and a number of seats left in the balcony, at a given price. In another example, the system could give to the user the ability to view all the restaurants that are open for business and have available seating for one or more people on the chosen evening.

Finally, the system is able to propose one or more optimized series of services for which there is availability, and that will take place in a given period of time. The optimization process aims at scheduling this succession of events under various constraints: optimization for time efficiency and minimization of geographical distance. Time and geography are the default most basic constraints. But the optimization engine is scalable and flexible and additional criteria can be taken into account, such as cost efficiency, reviews, etc. An optimization algorithm assigns a "score" to each series of services that can thereby be ranked.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 is a simulated user interface screen shot;

DETAILED DESCRIPTION OF THE INVENTION

Figure 1:
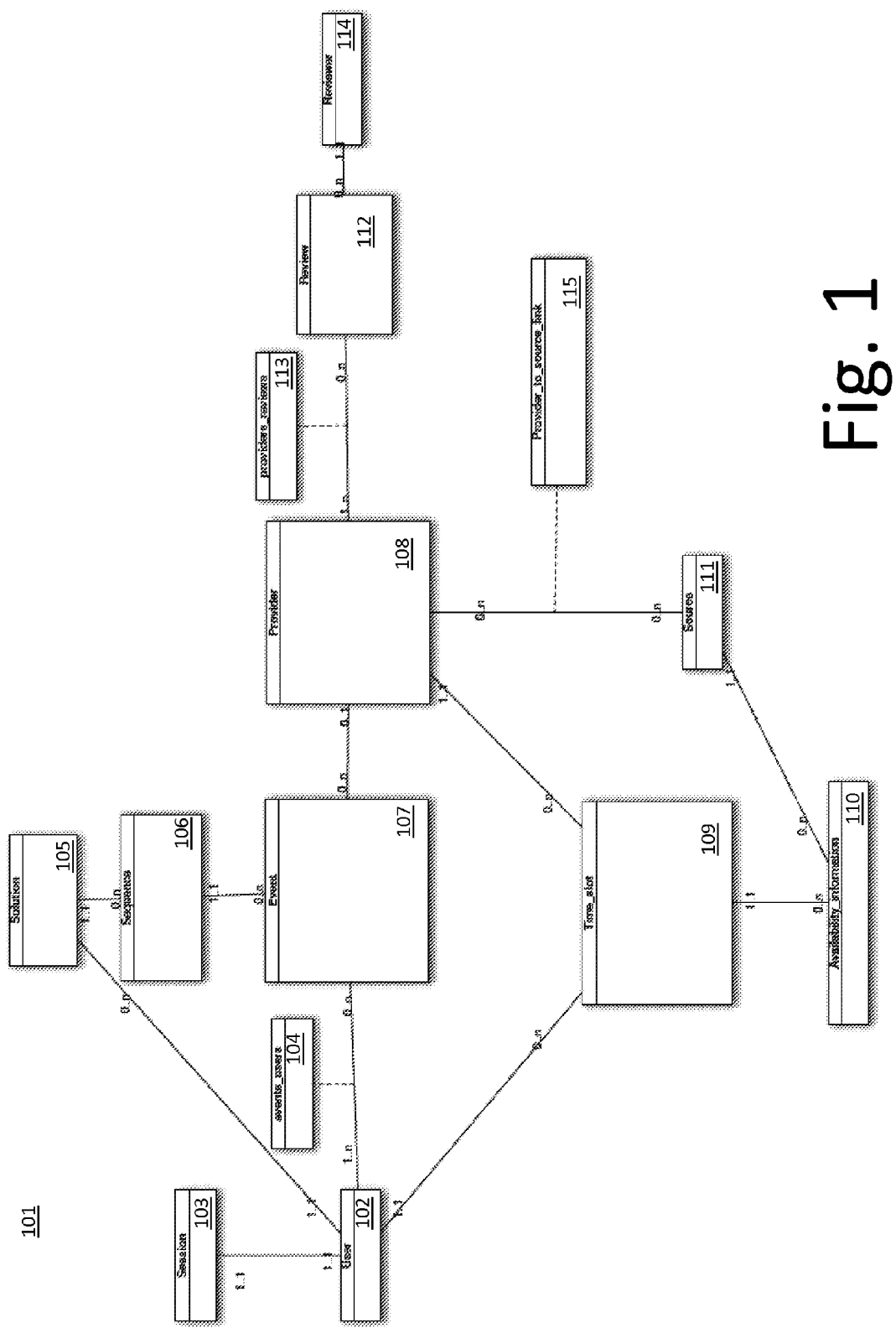
FIG. 1 is a graph providing an overview of the system organization.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The system for optimizing web searching and scheduling of service providers taught by the present invention has three main characteristics. The present invention teaches a system and method for search optimization that automatically aggregates service providers and their services; checks, in real time, the availability information for the service providers; and proposes one or more optimized series of services for which there is availability. The system is versatile and can be used for virtually all types of service providers.

First, the system automatically aggregates service providers and their services, including schedule. For example, for a specific concert venue, the system is able to tell that there will be a classical music concert with certain orchestra playing a specific performance, on that specific date, at that specific time. The system also aggregates additional data on these service providers such as: address, phone numbers, reviews, etc. All data referring to a specific service provider is aggregated from potentially multiple data sources. For example, these sources can be the provider website itself, online booking services that gather providers' information, etc.

Second, wherever possible, the system can check, in real time, the availability information for the service providers. The availability is used as a criterion for the schedule optimization defined in the third point. For the concert example with the first characteristic above, the system will be able to tell at any time that there are a number of seats left in the front stalls, at a given price, and a number of seats left in the balcony, at a given price. In another example, the system could give to the user the ability to view all the restaurants that are available for one or more people on the chosen evening.

Finally, the system is able to propose one or more optimized series of services for which there is availability, and that will take place in a given period of time. The optimization process aims at scheduling this succession of events under various constraints: optimization for time efficiency; minimization of geographical distance; and optimization for cost efficiency. Time and geography are the default most basic constraints. But the optimization engine is scalable and flexible and additional criteria can be taken into account, such as cost efficiency, reviews, etc. An optimization algorithm assigns a "score" to each series of services that can thereby be ranked.

Now referring to the Figures, the embodiment of the system overview and key components are shown. Referring to FIG. 1, the graph provides an overview of the system organization 101. By connecting to the system, a user 102 opens a session 103. With a session open 103, a solution is plotted from the criteria of events 104 entered by the user. A solution 105 is a set of sequences 106 and a sequence is a series of events 107 defined by the user and optimized for one or more criteria. In one example illustrated herein, the solution consists, in one sequence of: a restaurant event followed by a music event; the optimization criteria are geographic distance, time optimization, and reviews.

An event 107 involves one or more users 104 and a provider 108 (in one example illustrated herein, a table booked at a restaurant for one or more uses at a specific time). For all the different agents (users and providers) of the system, the system maintains a schedule, defined as a set of time slots 109 (in one example illustrated herein, a restaurant offers tables for a plurality of time blocks/slots). For each of the time slots 109, the system maintains availability information 110, for example how many seats are available at the restaurant for 8 pm.

There might be a plurality of availability information for the same time slot since there might be different categories of availability. For example, for a flight on an airline, at a specific date and time, there might be one or more seats available in economy at a first price and one or more seats available in business class at a second price.

The source 111 stores provider information such as name and address and/or availability information for the providers and provides a link 115 to the information stored in the source 111 to the providers 108. For providers 108, reviews 112, which are critical provider reviews 113 from external sources provided by different reviewers 114, are stored and maintained in the source 112.

Figure 2:
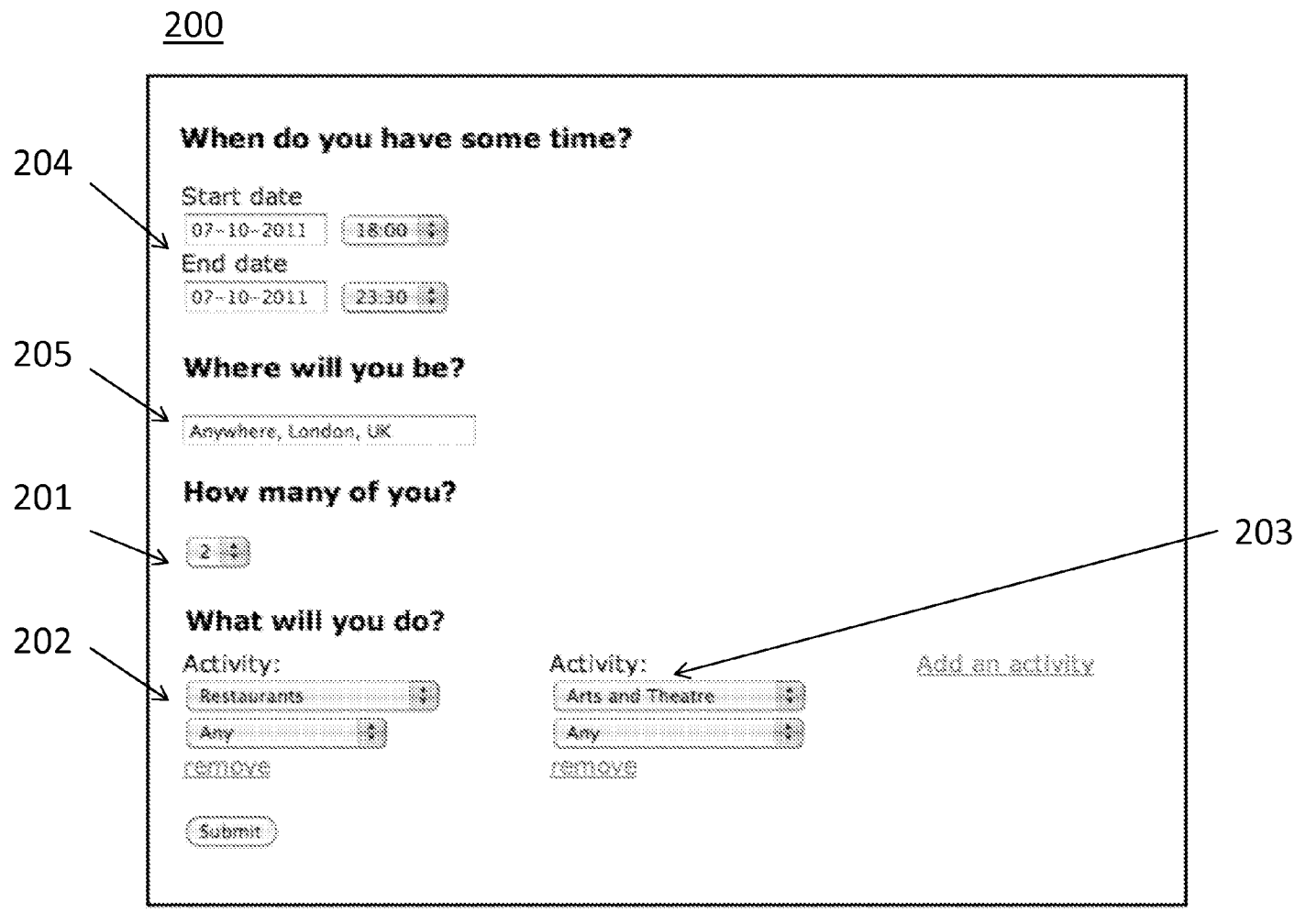
Figure 3:
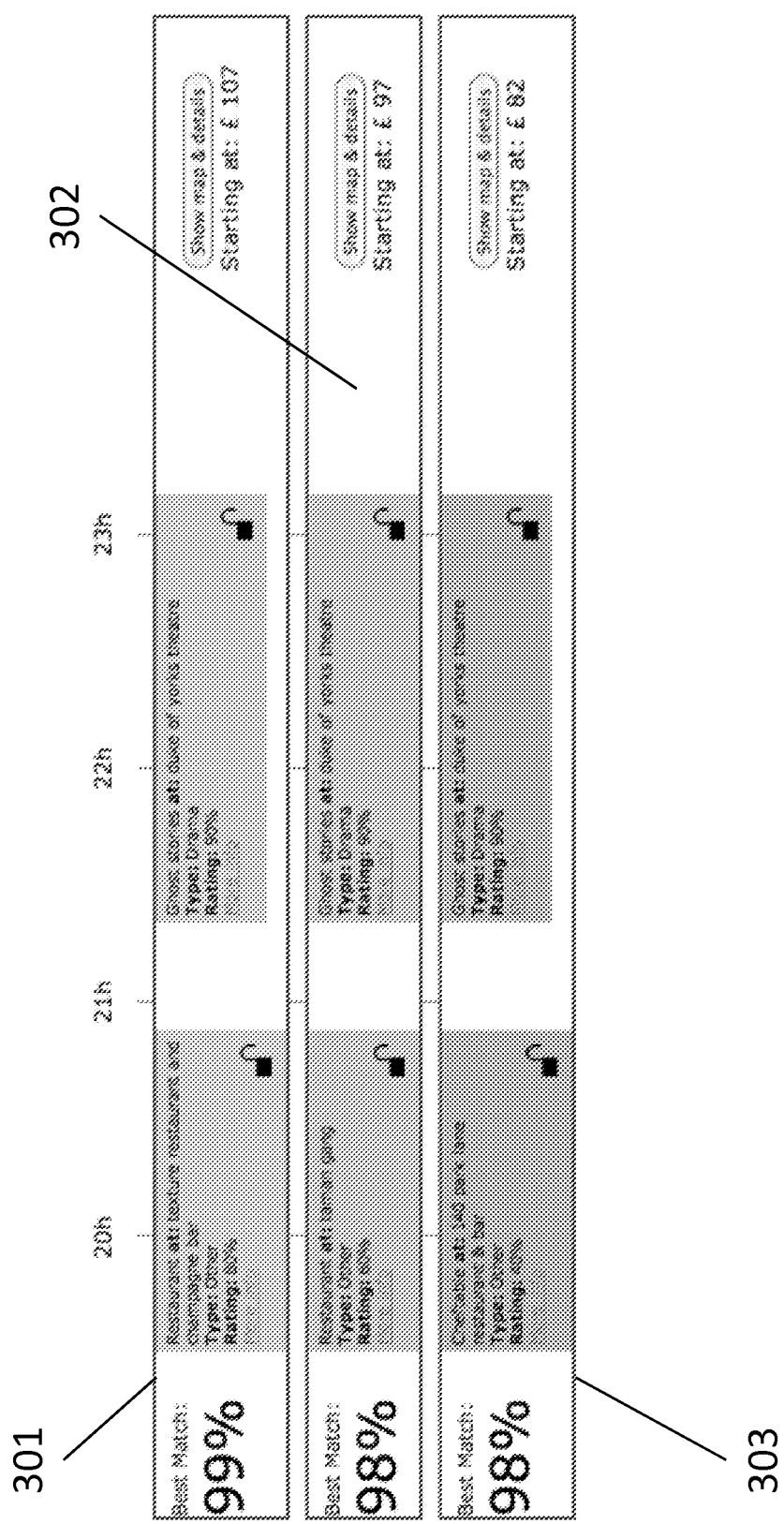
FIG. 3 is a simulated screen shot of the graphical format for displaying the results as optimized by the algorithm and returned to a user for review.

Now referring to FIG. 2, a simulated user interface screen shot 200 is shown. The user interface screen 200 is the initial screen where the user can specify constraints for organizing a night out. In this example, the user is looking to organize a night out for two people 201, on a specific date and during a specific time period 204, at a specific location 205, starting with a restaurant 202 and then a show 203 for their activities. Results as optimized by the algorithm and returned is graphical format as shown in FIG. 3. As shown in FIG. 3, the system returns different possible sequences 301, 302, and 303 to the user, ranked by a score, referred to as "Best Match" in this illustrated example, which is a combination of multiple criteria, such as proximity of the providers, time efficiency, reviews, etc. For instance the best sequence found for this example as illustrated in FIGS. 2 and 3 is "texture restaurant and champagne bar" from 7.30 pm to 9 pm, followed by a drama, "Ghost Stories" from 9.30 pm to 11.30 pm which is the first sequence 301 of the different possible sequences 301, 302, and 303.

Figure 4:
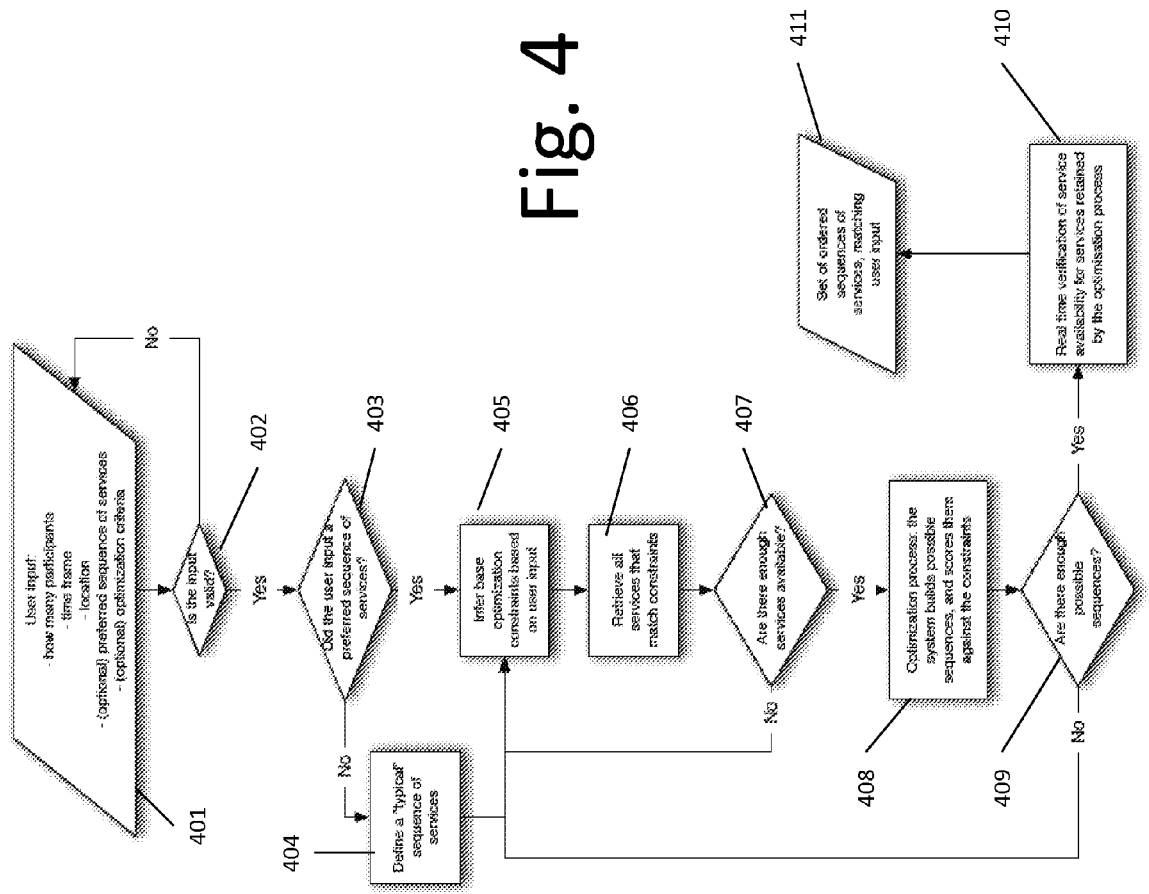
FIG. 4 is a flowchart illustrating the method steps of the present invention.

Now referring to FIG. 4, a flowchart illustrating the method steps of the present invention is shown. In the first steps, the user sketches out its request 401. The user provides information to define its request such as: how many participants: number of participants for the sequence; time frame: when are the participants available for the sequence; location: where do the participants want to go; preferred series of services (optional): the user can specify what activities they want to do, and in which order (in the illustrated example, a restaurant event followed by a arts and theatre event); and optimization criteria (optional): the user can specify on which criteria to optimize the sequence. In the illustrated example, the optimization criteria are hidden to the user (i.e. they are the "default ones"), and are in fact geographic distance, time efficiency, and reviews.

In the next step 402, the system checks that the data are consistent and valid, rejecting errors like date in the past, and a wrong address. If the input is not valid, the user will be asked to amend it.

Next the system determines if the user inputted a preferred sequence of services 403. If the user did not input a preferred sequence of services, the system will generate one.

In the next step 404, the system generates a typical sequence of services for the user. For instance, the sequence can be generated by using the most frequent sequence of services requested by other users for similar time frames and locations. Then the system generates the solutions for the user.

In the next step 405, based on the user input, the system defines base constraints on the service providers. For example, the system will only select services that happen in the time frame passed by the user, that are less than a first distance away from the destination, that have reviews greater than a certain percentage, etc. Next, using the constraints defined in the previous step 405, the system then retrieves a subset of matching service providers from the database in step 406. In a subsequent step 407, if there are not enough services available then the system goes back to the previous step and redefines the base constraints on the service providers to broaden the search universe. For example, redefining the search for service providers that are within a new specific distance away from the location specified by the user, where the second specified distance is more than the first specified distance.

During the optimization process 408 the system builds possible sequences, and scores them against the constraints. During this optimization phase, the system finds the best combinations of events matching the optimization criteria. The system assigns a score to each sequence. The better the optimization, the higher the score.

If the optimization process 408 has not found enough acceptable sequences as determined in step 409, the system goes back to the previous step 405 and redefines the base constraints on the service providers to broaden the search universe. For example, redefining the search for service providers that are within a new specific distance away from the location specified by the user, where the second specified distance is more than the first specified distance.

Next in step 410, real time verification of service availability for the services retained by the optimization process is determined. For each acceptable sequence, the system checks the availability of all the service providers used in this sequence. If one service provider is not available anymore, the sequence is discarded.

Finally in step 411, the system returns the ordered sequences of services, matching user input. From this returned order, the user can select a desired sequence.

Figure 5:
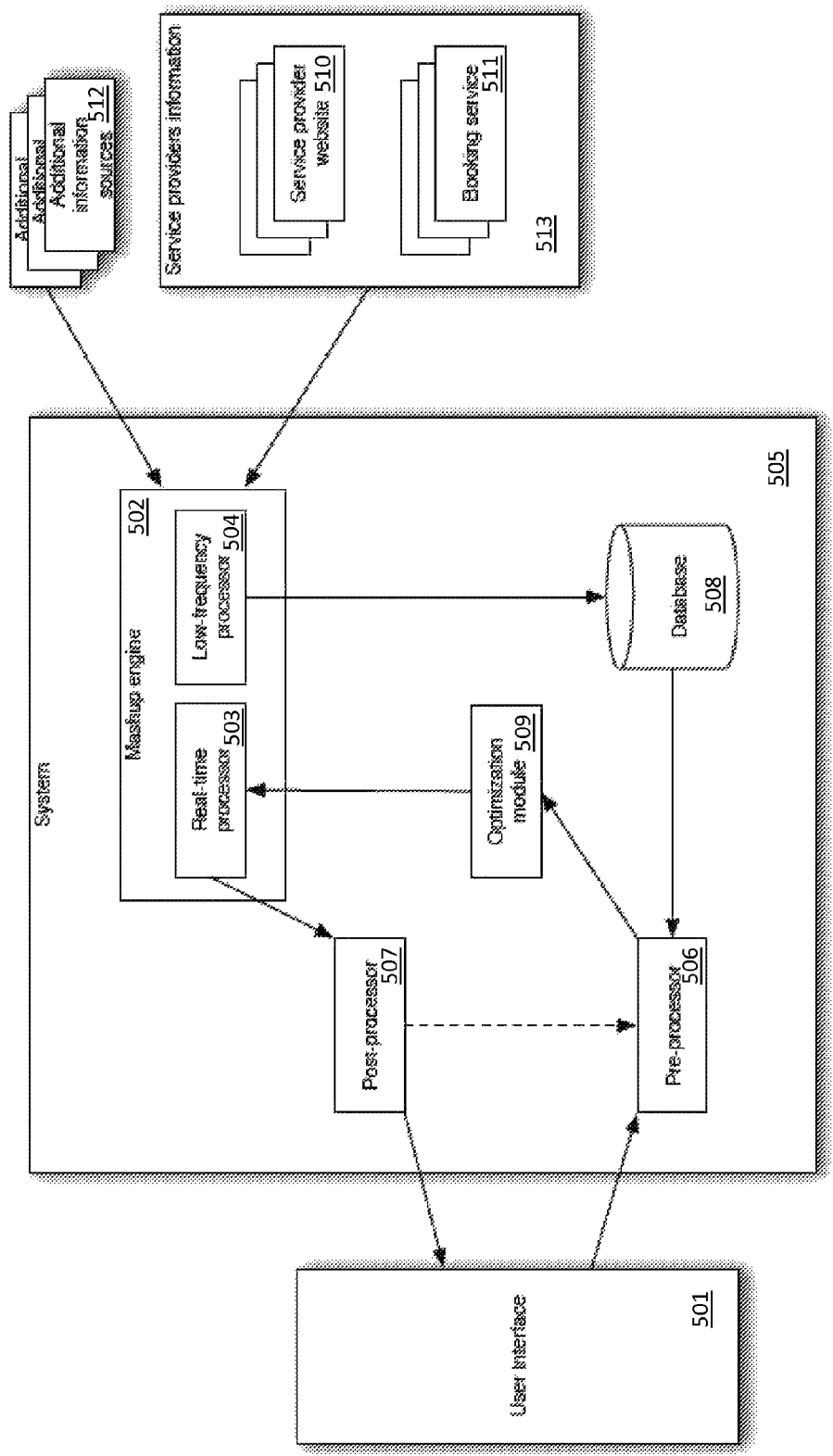
FIG. 5 is a diagram of the system architecture of the present invention which provides the physical execution and transformation of the method of the present invention.

Now referring to FIG. 5, the system architecture of the present invention is shown. The user interface 501 has two roles: to collect user input on one side of the user interface display, and to display the results generated by the system and to let the user interact with them on the other side of the user interface display. A mashup engine 502 is provided to connect the system to third party systems, to retrieve specific information about service providers and their availability. The mashup engine 502 is further comprised of two subunits: a low frequency processor 504 and a real-time processor 503. The low frequency processor 504 processes the data that does not need to be live (for instance: service providers' geographic coordinates, reviews, etc). The low frequency processor 504 works as a background process, independently from a user request. The real-time processor 503 is responsible for the real-time availability checking The real-time processor 503 is triggered when a user request is submitted to the system 505.

A pre-processor 506 converts the user input into a set of criteria, then polls the database 508. Depending on the items retrieved from the database 508, the pre-processor 506 is able to adjust the criteria and poll the database 508 again. For example, if the number of items found is too low, the preprocessor 506 will relax the settings and poll the database 508 again.

An optimization module 509 optimizes the user request as described above.

A post processor 507 checks the consistency of the results from the optimization module 509 and will loop if there are not enough results.

The database 508 is where the system 505 stores all the required low-frequency data (service providers' coordinates, reviews, etc.) as well as some cached real time availability information.

Additionally, there are external systems, for example web APIs that provide service providers' information 513: name, address, availability, etc. They can be service providers' websites 510, booking services 511 and more. The system 505 is also able to connect to other additional sources of information 512 to collect additional data on the service providers and their services. For example, these could be external, third party, sources of reviews for the service providers.

An optimization algorithm is used to create scoring for each series of events that can thereby be ranked. The system ranks a sequence made of one or more (n) events (For example: a restaurant followed by a show, where n=2, for 2 events). For each event i (i=1 to n) there are m(i) possible providers denoted e(i,j) (with j=1 to m(i)). Next a set of p1 independent parameters (example: rating, cost, etc.) and p2 dependent parameters (example: distance) are defined. To each independent parameter i is associated a function f1,$i$ and to each dependent parameter i is associated a function ff2,$i$. For any given set of providers (there are product_i=1 to n m(i) possible sets), then a score function is defined as: score=sum_i=1_to_p1,j=1_to_n f1,e(i)+sum_i=1_to_p2 f2, e(i). Where e is a solution vector made of e(i) events (i=1 to n). The algorithm minimizes the score function.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A computer-implemented method for optimizing web searching and scheduling of service providers, the method comprising the steps of:
   aggregating service providers and their services;
   checking, in real time, the availability information for the service providers;
   using the availability as a criterion for a schedule optimization;
   proposing one or more optimized series of services (schedule) for which there is availability;
   scheduling one or more series of events under various constraints;
   scoring each series of events that can thereby be ranked;
   assigning a score to each series of services that can thereby be ranked;
   aggregating additional data on the service providers including address, phone numbers, and reviews;
   providing information to define a request;
   checking that the information is consistent;
   rejecting errors in the information;
   requesting amended information if the information is not valid;
   determining if a preferred sequence of services was requested;
   generating a preferred sequence of services if one was not requested;
   generating a typical sequence of services;
   generating a solution sequence of services;
   retrieving a subset of matching service providers from the database using the defined constraints;
   redefining the base constraints on the service providers to broaden the search universe if there are not enough services available;
   building possible sequences;
   scores the possible sequences against the constraints;
   determining the best combinations of events matching the optimization criteria;
   assigning a score to each sequence;
   redefining the base constraints on the service providers to broaden the search universe if the optimization process has not found enough acceptable sequences;
   determining real time verification of service availability for the services;
   checking the availability of all the service providers used in each acceptable sequence;
   discarding a sequence if one service provider is not available; and
   returning the ordered sequences of services.

2. The method as described in claim 1, further comprising the steps of: automatically aggregating service providers and their services, including their schedule.

3. The method as described in claim 1, further comprising the steps of: aggregating all data referring to a specific service provider from one or more data sources.

4. The method as described in claim 1, wherein the availability of a service provider is used as a criterion for scheduling one or more series of events.

5. The method as described in claim 1, wherein the constraints are selected from the group consisting of: optimization for time efficiency; minimization of geographical distance; and optimization for cost efficiency.

6. The method as described in claim 5, wherein time efficiency and geographical distance are the default constraints.

7. The method as described in claim 1, wherein the constraints are selected from the group consisting of: cost efficiency and reviews.

8. The method as described in claim 1, further comprising the steps of:
   connecting to a computer system;
   opening a session;
   entering criteria; and
   plotting a solution from the entered criteria entered by the user.

9. The method as described in claim 1, wherein a solution is a set of sequences, and a sequence is a series of defined events and optimized for one or more criteria.

10. The method as described in claim 1, further comprising the steps of:
    maintaining a schedule, defined as a set of time slots; and
    maintaining availability information for each of the time slots.

11. The method as described in claim 10, wherein a plurality of availability information for the same time slot is provided when there are different categories of availability.

12. The method as described in claim 1, further comprising the steps of:
    storing provider information; and
    storing and maintaining provider reviews, which are critical reviews from external sources provided by different reviewers.

13. The method as described in claim 1, further comprising the steps of:
    specifying constraints for organizing a night out;
    optimizing results by an algorithm;
    returning results in a graphical format; and
    returning different possible sequences, ranked by a score, which is a combination of multiple criteria.

14. The method as described in claim 1, wherein information provided to define a request are selected from the group consisting of: the number of participants for the sequence; time frame for when the participants are available for the sequence; locations where do the participants want to go; a preferred series of services where activities and the order in which order they are to be completed is specified; and optimization criteria to specify on which criteria to optimize the sequence.

15. The method as described in claim 1, wherein the sequence are generated by using the most frequent sequence of services requested by other users for similar time frames and locations.

16. The method as described in claim 1, wherein defining base constraints on services that happen in the time frame passed by the user, that are less than a first distance away from the destination, and that have reviews greater than a certain percentage.

17. The method as described in claim 1 wherein redefining the base constraints on the service providers to broaden the search universe if there are not enough services available by redefining the search for service providers that are within a new specific distance away from the location specified by the user, where the second specified distance is more than the first specified distance.

18. The method as described in claim 1, further comprising:
    connecting the computer implementing the method to third party computer systems by a mashup engine;
    the mashup engine is further comprised of two subunits:
        a low frequency processor and a real-time processor, processing the data that does not need to be live working as a background process, independently from a request; and
        a real-time processor responsible for the real-time availability checking triggered when a request is submitted;
    retrieving specific information about service providers and their availability from the third party computer systems of service providers;
    converting the input into a set of criteria by a pre-processor,
    polling the database;
    adjusting the criteria depending on the items retrieved from the database by the mashup engine;
    polling the database again;
    checking the consistency of the results by a post processor;
    repeating the process if there are not enough results;
    storing all the required low-frequency data as well as some cached real time availability information in a database;
    connecting to other sources of information to collect additional data on the service providers and their services;
    using an optimization to create scoring for each series of events that can thereby be ranked; and
    ranking a sequence made of one or more events; by
        determining the number of possible providers;
        determining independent parameters;
        determining dependent parameters;
        associating a function to each independent and independent parameter,
        determining the number of possible sets for each provider, and
        generating a score for each possible set.

* * * * *